United States Patent
Juncker et al.

[11] Patent Number: 6,068,353
[45] Date of Patent: May 30, 2000

[54] TRACK APPARATUS INCORPORATING NON-PNEUMATIC WHEELS

[75] Inventors: Kenneth J. Juncker, Mt. Vernon, Ind.; Gary L. Kelderman, Oskaloosa, Iowa; Glenn W. Kahle, Gibsonia, Pa.

[73] Assignee: AgTracks, Inc., Mt. Vernon, Ind.

[21] Appl. No.: 09/113,180

[22] Filed: Jul. 10, 1998

[51] Int. Cl.$^7$ .................................................. B62D 55/00
[52] U.S. Cl. ........................ 305/130; 305/199; 305/138; 305/135; 305/195; 305/125; 305/137
[58] Field of Search ..................................... 305/199, 138, 305/135, 115, 193, 195, 194, 124, 125, 129, 130, 136, 137, 15; 180/9.62, 9.21; 301/6.1, 1, 105.1, 111; 152/1, 5, 7, 8

[56] References Cited

U.S. PATENT DOCUMENTS

| | | | |
|---|---|---|---|
| 1,258,573 | 3/1918 | Johnstone | 152/7 |
| 2,467,947 | 4/1949 | Skelton | 180/9.5 |
| 2,496,136 | 1/1950 | Smith | 305/139 |
| 2,603,267 | 7/1952 | Simpson | 152/7 |
| 3,039,828 | 6/1962 | Johnston | 305/15 |
| 3,188,775 | 6/1965 | Cosmos | 152/7 |
| 3,219,090 | 11/1965 | Cislo | 152/7 |
| 3,311,149 | 3/1967 | Mathiesen | 152/7 |
| 3,689,123 | 9/1972 | Barbieri | 305/9.5 |
| 3,774,708 | 11/1973 | Purcell et al. | 180/9.5 |
| 3,801,164 | 4/1974 | Mazzarins | 305/15 |
| 3,841,424 | 10/1974 | Purcell et al. | 180/9.5 |
| 3,912,336 | 10/1975 | Ritter, Jr. et al. | 305/100 |
| 3,938,606 | 2/1976 | Yancey | 180/9.5 |
| 4,056,288 | 11/1977 | Stedman | 305/34 |
| 4,069,856 | 1/1978 | Sogge | 152/27 |
| 4,097,093 | 6/1978 | Shelby et al. | 305/125 |
| 4,203,633 | 5/1980 | Hare | 305/136 |
| 4,339,156 | 7/1982 | Livesay | 305/125 |
| 4,373,758 | 2/1983 | Livesay | 305/125 |
| 4,406,501 | 9/1983 | Christensen | 305/145 |
| 4,832,098 | 5/1989 | Palinkas et al. | 152/7 |
| 4,834,478 | 5/1989 | Stevens et al. | 305/124 |
| 4,945,962 | 8/1990 | Pajtas | 152/7 |
| 4,953,919 | 9/1990 | Langford | 305/144 |
| 5,005,922 | 4/1991 | Edwards et al. | 427/571 |
| 5,139,066 | 8/1992 | Jarman | 152/7 |
| 5,273,126 | 12/1993 | Reed et al. | 180/9.21 |
| 5,316,381 | 5/1994 | Isaacson et al. | 305/145 |
| 5,340,205 | 8/1994 | Nagorcka | 305/132 |
| 5,343,916 | 9/1994 | Duddey et al. | 152/5 |
| 5,343,960 | 9/1994 | Gilbert | 182/823 |
| 5,452,949 | 9/1995 | Kelderman | 305/129 |
| 5,607,210 | 3/1997 | Brazier | 305/131 |
| 5,842,757 | 12/1998 | Kelderman | 305/125 |
| 5,899,542 | 5/1999 | Lykken et al. | 305/131 |
| 5,899,543 | 5/1999 | Lykken et al. | 305/131 |

FOREIGN PATENT DOCUMENTS 796113    6/1958    United Kingdom ................ 152/7

*Primary Examiner*—S. Joseph Morano
*Assistant Examiner*—Long Bao Nguyen
*Attorney, Agent, or Firm*—Jansson, Shupe Bridge & Munger, Ltd.

[57] ABSTRACT

A track apparatus is provided for mounting on a rotatable axle of a vehicle. The track apparatus includes a flexible track having an upper length and a ground-engaging lower length. A drive wheel is mountable to the rotatable axle so as to drive the flexible track in response to rotation of the axle. Leading and trailing idler assemblies are attached to the frame. Each idler assembly includes a non-pneumatic idler wheel having a plurality of voids therein. In addition, a bogie assembly is also supported by the frame. The bogie assembly includes a non-pneumatic bogie wheel having a plurality of voids therein. The idler wheels and the bogie wheels have increased dimensional reliability and provide shock absorption and self-cleaning features to the track apparatus.

28 Claims, 12 Drawing Sheets

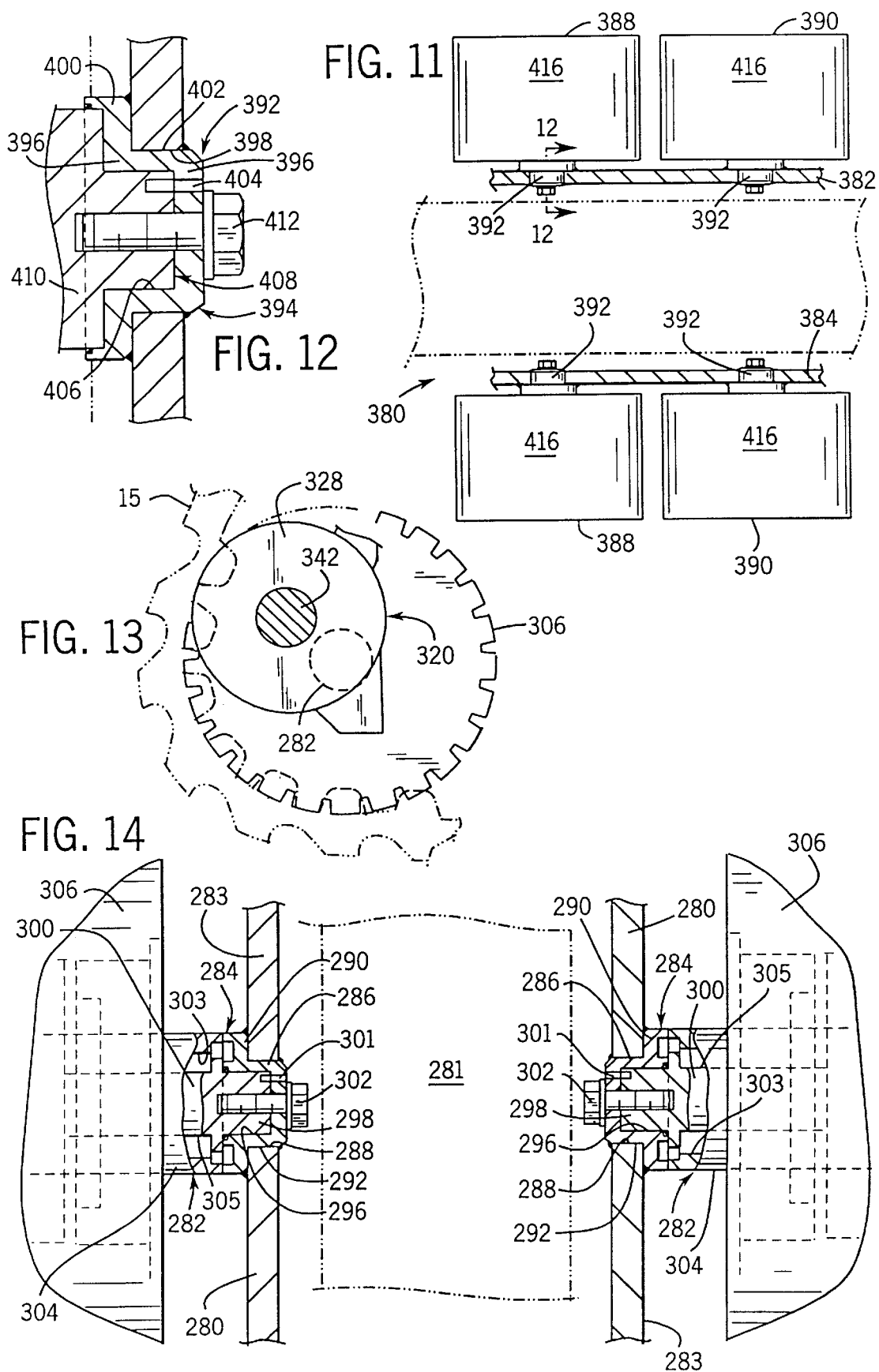

TRACK APPARATUS INCORPORATING NON-PNEUMATIC WHEELS

BACKGROUND AND SUMMARY OF THE INVENTION

This invention relates to a track system for vehicles, and in particular, to an improved track system incorporating non-pneumatic wheels.

Agricultural implements such as tractors, combines and the like are commonly used in agricultural fields for a variety of jobs. Typically, these agricultural implements incorporate tires on which the implement is supported. Since these types of large agricultural implements are quite heavy, the weight of agricultural implements are distributed to a relatively small area on the tires of the implements. As a result, the tires on the agricultural implements tend to compact the soil in the fields. Compacted soil discourages the growth of crops planted in the fields which need loose soil to flourish.

In addition, since agricultural fields are often wet due to rain or watering, agricultural implements which enter the fields become bogged down in the mud due to the fact that there is such a small area of the tire in contact with the soil. As such, it is highly desirable to develop a track system for vehicles which disburses the weight of the agricultural implement over a larger area so as to reduce the compaction of the soil in the agricultural fields and to provide a track with a larger surface area which contacts the soil so as to prevent the agricultural implement from becoming bogged down in mud in the fields.

A prior track system for vehicles is disclosed in Kelderman, U.S. Pat. No. 5,452,949, assigned to the Assignee of the present invention and incorporated herein by reference. The Kelderman '949 patent discloses a track suspension system for a vehicle having a frame and a continuous track. The drive wheel is attached to the frame for engaging and driving the continuous flexible track. The drive wheel has a plurality of drive projections disposed thereon which engage depressions in the rubber track. As the drive wheel rotates, it engages and drives the continuous flexible track about the leading and trailing idler assemblies, and the mid-roller assembly.

As best seen in FIGS. 2, 8 and 11, of the Kelderman '949 patent, a complex structure incorporating a gas cylinder is necessary to provide shock absorption for the track apparatus disclosed therein. Further, it is difficult to inflate the idler and bogie wheels to an accurate dimension. Consequently, the positions of the idler assemblies and/or the mid-roller assemblies must be adjusted to compensate for inflation-related dimension changes to the wheels. Finally, pneumatic wheels are subject to fail at any time resulting in increased downtime for the agricultural implement.

In order to overcome problems with pneumatic wheels, steel wheels have been incorporated into prior art track systems. However, steel wheels provide no shock absorption for the track apparatus and tend to damage the flexible track. As a result, steel wheels are not a reliable substitute for the pneumatic wheels shown in the Kelderman '949 patent.

Therefore, it is a primary object and feature of the present invention to provide a track apparatus with a simplified structure for shock absorption.

It is a further object and feature of the present invention to provide a track apparatus which incorporates idler and bogie wheels having increased dimensional reliability.

It is a still further object and feature of the present invention to provide a track apparatus which incorporates idler and bogie wheels less are likely to fail.

In accordance with the present invention, a track apparatus having a frame is provided. The track apparatus is mountable on a rotatable axle of a vehicle and includes a continuous flexible track having an upper length and a ground-engaging lower length. A drive wheel is mountable to the rotatable axle of the vehicle for rotational movement therewith. The drive wheel engages the inner surface of the flexible track along the upper length to drive the flexible track in response to rotation of the axle of the vehicle. A leading idler arm has a proximal end mounted to the frame and a distal end. A leading idler wheel is rotatably mounted on the distal end of the leading arm and engages the inner surface of the flexible track. The leading idler wheel includes a first set of spaced void. It is also contemplated that the leading wheel include a second set of spaced voids therein. The second set of spaced voids in the leading idler wheel are radially spaced from the first set of voids therein. The leading idler wheel has an axial center and a predetermined radius. Each void of the first set of spaced voids is a predetermined radial distance from the axial center of the leading idler wheel. Similarly, the second set of voids is a predetermined radial distance from the axial center of the leading idler wheel.

The track apparatus also includes a trailing idler arm having a proximal end mounted to the frame and a distal end. A trailing idler wheel is rotatably mounted on the trailing idler arm for rotational movement therewith. The trailing idler wheel includes a first set of spaced voids therein. It is also contemplated that the trailing idler wheel include a second set of spaced voids therein. The second set of spaced voids in the trailing idler wheel are radially spaced from the first set of voids in the trailing idler wheel.

The track apparatus further includes a bogie arm having a trailing end mounted to the frame and a leading end. A leading bogie wheel engages the inner surface of the flexible track along the lower length and is rotatably mounted adjacent the leading end of the bogie arm. The leading bogie wheel has a plurality of spaced voids therein. Each void of the first set of spaced voids in the leading bogie wheels is a predetermined radial distance from the axial center of the leading bogie wheel. The track apparatus also includes a trailing bogie wheel which engages the inner surface of the flexible track along the lower length and which is rotatably mounted adjacent the trailing end of the bogie arm. The trailing bogie wheel also includes a plurality of spaced voids therein.

In accordance with a further aspect of the present invention, a track apparatus having a frame is provided. The track apparatus is mountable on a rotatable axle of a vehicle and includes a continuous flexible track having an upper length and a ground-engaging lower length. A drive wheel is mountable to the rotatable axle of the vehicle for rotational movement therewith. The drive wheel engages the inner surface of the flexible track along the upper length to drive the flexible track in response to rotation of the axle of the vehicle. A leading idler assembly is attached to the frame and includes a leading idler wheel engaging the flexible track. The leading idler wheel has a plurality of voids therein.

The leading idler wheel also includes an axial center. A plurality of voids in the leading idler wheel includes a first set of voids at a predetermined radial distance from the axial center of the leading idler wheel, and a second set of voids radially spaced from the first set of voids.

The track apparatus further includes a trailing idler assembly attached to the frame. The trailing idler assembly includes a trailing idler wheel engaging the flexible track and having a plurality of voids therein. The trailing idler wheel has an axial center wherein the plurality of voids in the trailing idler wheel include a first set of voids at a predetermined radial distance from the axial center of the trailing idler wheel and a second set of voids radially spaced from the first set of voids.

A leading bogie assembly is supported by the frame and includes a leading bogie wheel engaging the inner surface of the flexible track along the lower length. The leading bogie wheel has a plurality of spaced voids therein. The plurality of voids in the leading bogie wheel are a predetermined radial distance from the axial center of the leading bogie wheel.

A trailing bogie assembly is supported by the frame and includes a trailing bogie wheel engaging the inner surface of the flexible track along the lower length. The trailing bogie wheel has a plurality of spaced voids therein wherein the plurality of voids in the trailing bogie wheel are a predetermined radial distance from the axial center of the trailing bogie wheel.

In accordance with a still further aspect of the present invention, a track apparatus having a frame is provided. The track apparatus is mountable on a rotatable axle of a vehicle and includes a continuous flexible track having an upper length and a ground-engaging lower length. A drive wheel is mountable to the rotatable axle of the vehicle for rotational movement therewith. The drive wheel engages the inner surface of the flexible track along the upper length to drive the flexible track in response to rotation of the axle of the vehicle. A leading bogie assembly is supported by the frame and has a leading bogie wheel engaging the inner surface of the flexible track along the lower length. Each leading bogie wheel has plurality of voids therein. A trailing bogie assembly is also supported by the frame and has a trailing bogie wheel engaging the inner surface of the flexible track along the lower length. Each trailing bogie wheel has a plurality of voids therein.

The drive wheel includes upper and lower circumferential portions. The upper circumferential portions of the drive wheel engages the flexible track along the upper length. A leading idler assembly is attached to the frame. The leading idler assembly includes a leading idler wheel engaging the flexible track and having a plurality of spaced voids therein. A trailing idler assembly is also attached to the frame. The trailing idler assembly includes a trailing idler wheel engaging the flexible track and having a plurality of spaced voids therein.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

FIG. 11 is a cross-sectional view of the track system taken along line 11—11 of FIG. 2.

FIG. 12 is a cross-sectional view taken along line 12—12 of FIG. 11.

FIG. 13 is a cross-sectional view taken along line 13—13 of FIG. 3.

FIG. 14 is a cross-sectional view of the track system taken along line 14—14 of FIG. 2.

DETAILED DESCRIPTION OF THE DRAWINGS

Figure 1:
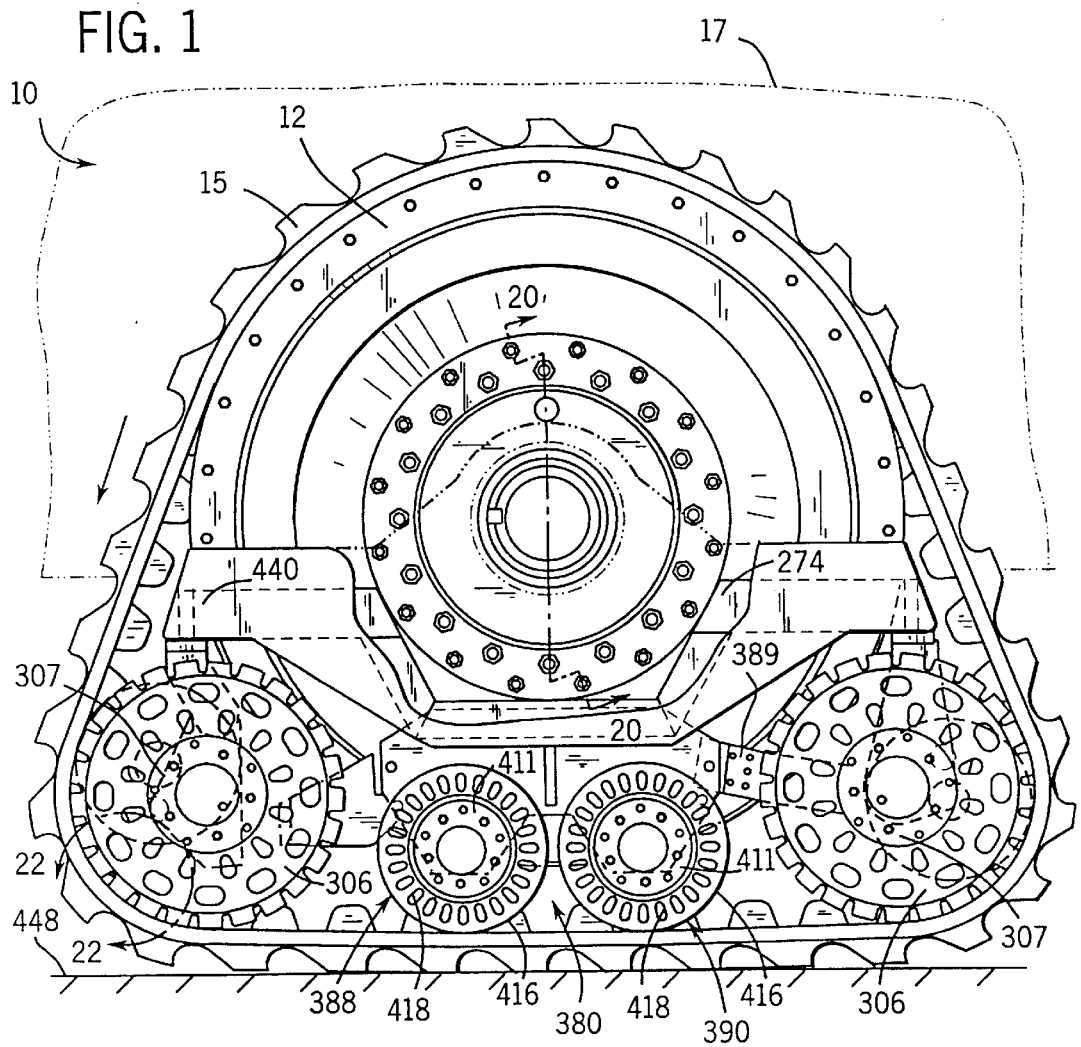
FIG. 1 is a side elevational view of a track system for a vehicle incorporating a drive wheel in accordance with the present invention.
Figure 7:
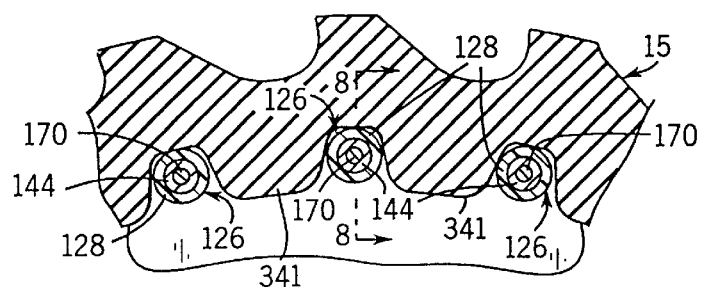
FIG. 7 is a enlarged, cross-sectional view of the track system taken along line 7—7 of FIG. 2.

Referring to FIG. 1, a track system incorporating a drive wheel in accordance with the present invention is generally designated by the reference numeral 10. In a preferred embodiment, the track system 10 is mounted on an axle 13 of an agricultural implement such as a tractor or combine. However, it is contemplated as being within the scope of the present invention for track system 10 to be mounted on other types of vehicles such as trucks, automobiles, and the like.

Figure 19:
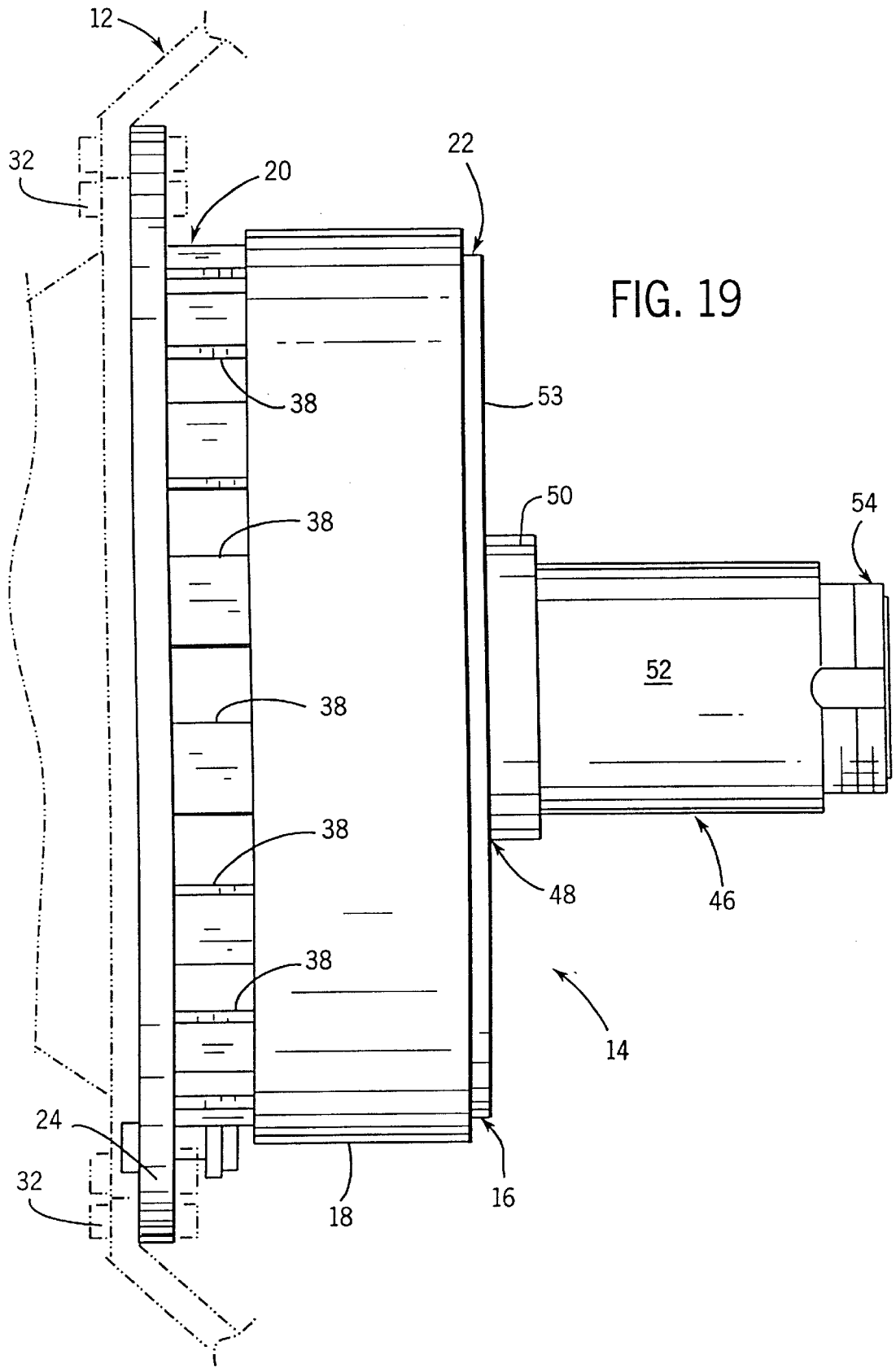
FIG. 19 is a side elevational view of the drive spindle of FIG. 18.
Figure 20:
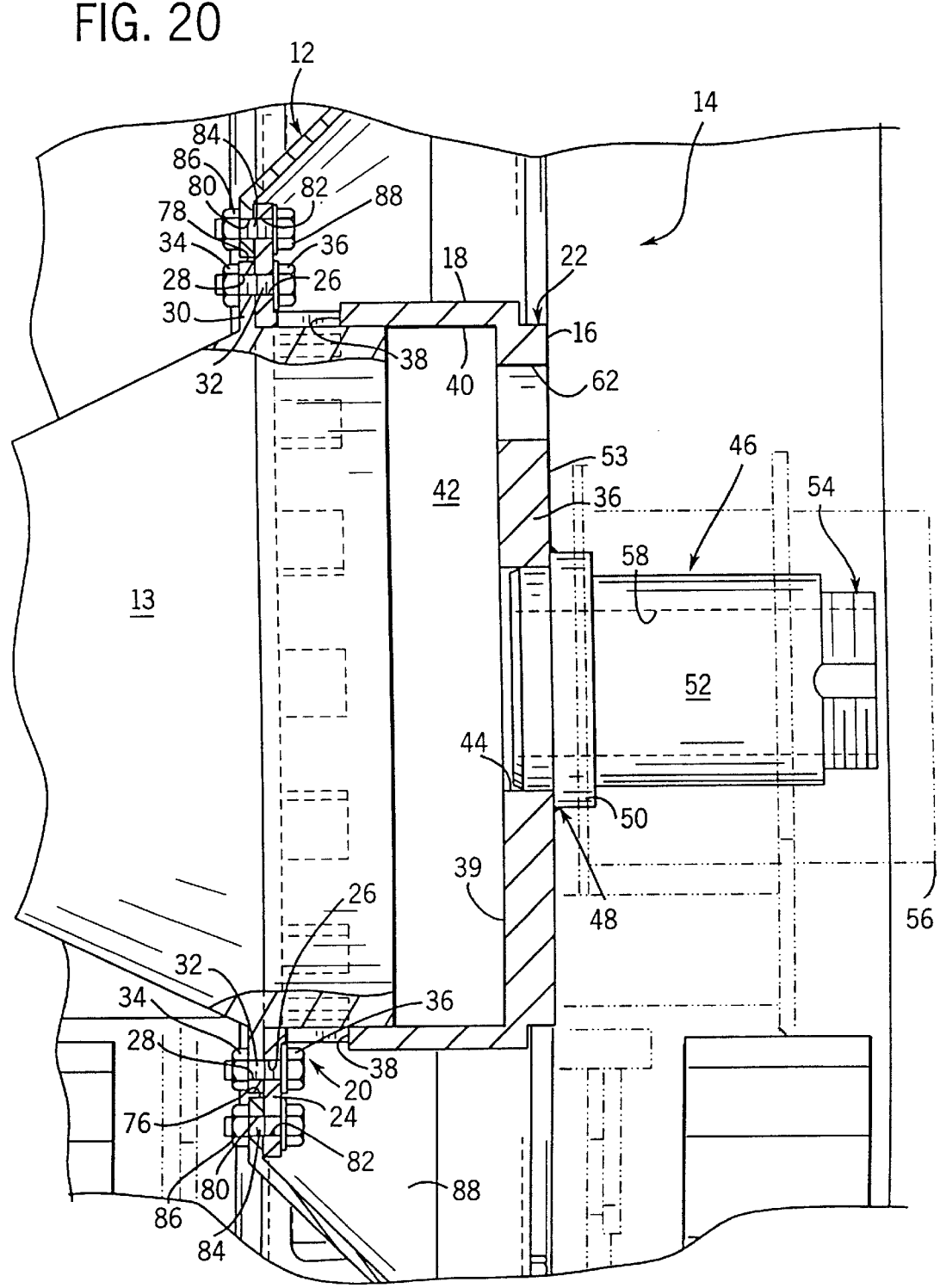
FIG. 20 is a cross-sectional view of the drive spindle taken along line 20—20 of FIG. 1.

Track system 10 includes a drive wheel 12 which mountable to axle 13 of a vehicle 17 for rotational movement therewith in order to drive a flexible track 15. As is conventional, axle 13 extends along and is rotatable about a longitudinal axis. As best seen in FIGS. 19–20, axle 13 is a planetary axle. However, it is contemplated that axle 13 be a bar axle or other type of axle without deviating from the scope of the present invention.

Figure 18:
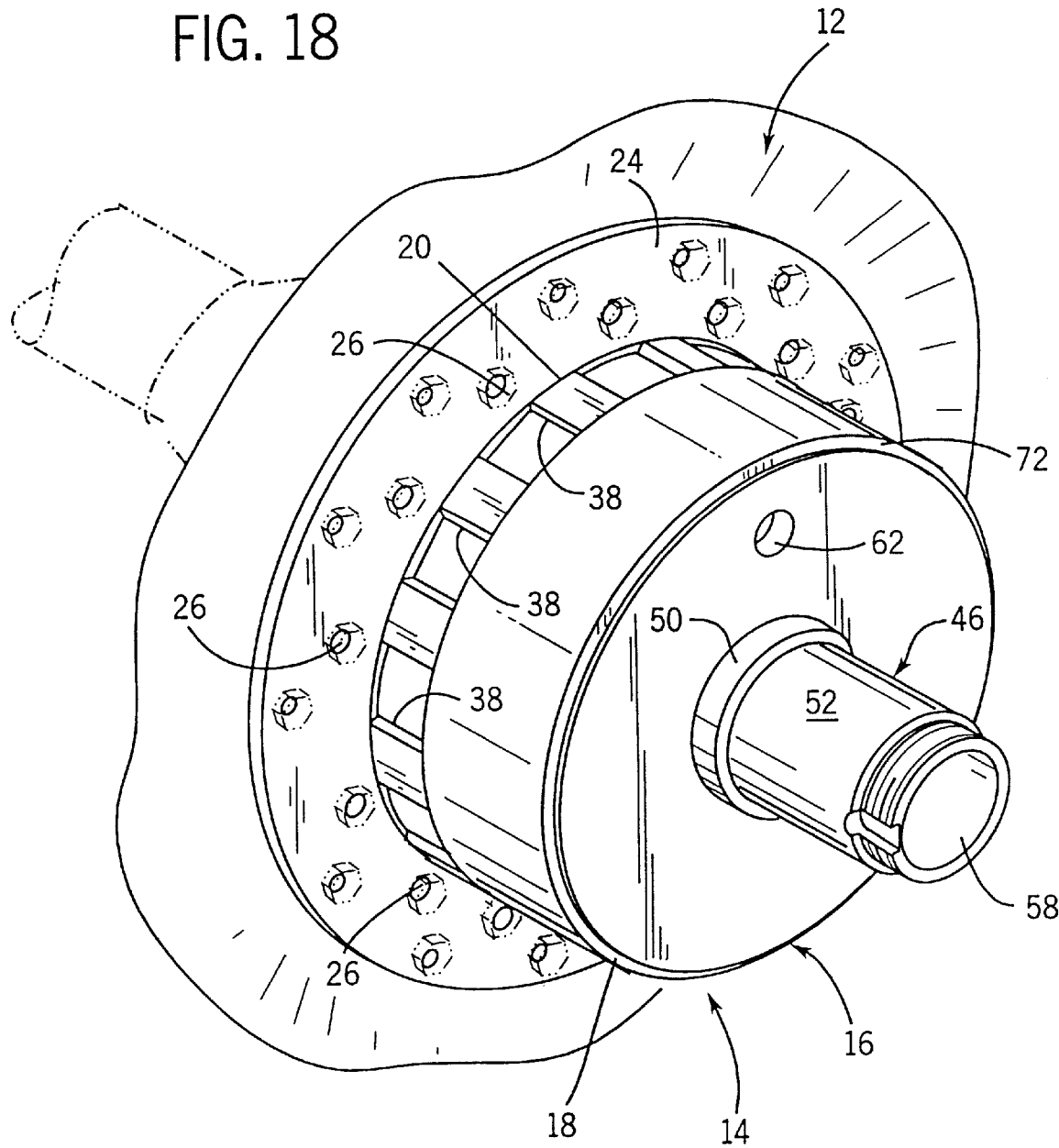
FIG. 18 is an isometric view of a drive spindle for the track system shown in FIG. 1.

Referring to FIGS. 18–20, drive wheel 12 is mountable on axle 13 by a mounting device 14. Mounting device 14 includes a drive spindle 16 having a generally cylindrical adaptor portion 18 with first and second opposite ends 20 and 22, respectively. Attachment flange 24 extends radially from first end 20 of adaptor portion 18 of drive spindle 16.

Attachment flange 24 includes a first set of spaced attachment openings 26 therein which are aligned with corresponding openings 28 formed in attachment flange 30 extending radially from axle 13. Bolts 32 extend through attachment openings 26 in attachment flange 24 of drive spindle 16 and through corresponding openings 28 in attachment flange 30 of axle 13. Nuts 34 are threaded on the ends of corresponding bolts 32 so as to capture attachment flange 24 of drive spindle 16 and attachment flange 30 of axle 13 between nuts 34 and corresponding bolt heads 32a of bolts 32, thereby interconnecting axle 13 with drive spindle 16 and allowing drive spindle 16 to rotate in unison with axle 13.

Adaptor portion 18 of drive spindle 16 further includes a plurality of circumferentially spaced slots 38 which are adjacent the first end 20 of drive spindle 16 and which are radially aligned with attachment openings 26 in attachment flange 24, and hence, with bolt heads 32a of bolts 32. Slots 38 facilitate the cooling of axle 13 and allow for access to bolt heads 36 of bolts 32 by a wrench or the like.

Second end 22 of adaptor portion 18 is substantially closed by a spindle support wall 36. The inner surface 39 of spindle support wall 36 and the inner surface 40 of adaptor portion 18 define a spindle cavity 42 within the interior of drive spindle 16. As best seen in FIG. 20, spindle cavity 42 is dimensioned for receiving a portion of axle 13 therein.

Spindle support wall 36 further includes an opening 44 having a center lying along the longitudinal axis of axle 13. A first end 48 of center spindle 46 is received within opening 44 in support wall 36 of adaptor portion 18. A collar 50 extends about the outer surface 52 of center spindle 46 and abuts the outer surface 53 of spindle support wall 36. Center spindle 46 further includes a second, opposite key end 54. A center spindle hub 56 is positioned over the center spindle 46. Bearings, bushes or the like are positioned between the inner surface of center spindle hub 56 and the outer surface 52 of center spindle 46 so as to allow center spindle 46 to rotate therein.

As best seen in FIG. 20, center spindle 46 includes a inner surface 58 which defines a passageway between the first 48 and the second 54 ends thereof. The passageway within center spindle 46 communicates with spindle cavity 42 within drive spindle 16, and allows track system 10 to be mounted onto agricultural vehicles which utilize bar axles.

Spindle support wall 36 further includes an access opening 62 therein. Access opening 62 communicates with cavity 42 within adaptor portion 18 so as to allow for an operator to gain access to cavity 42 within drive spindle 16 and lubricate axle 13.

Figure 5:
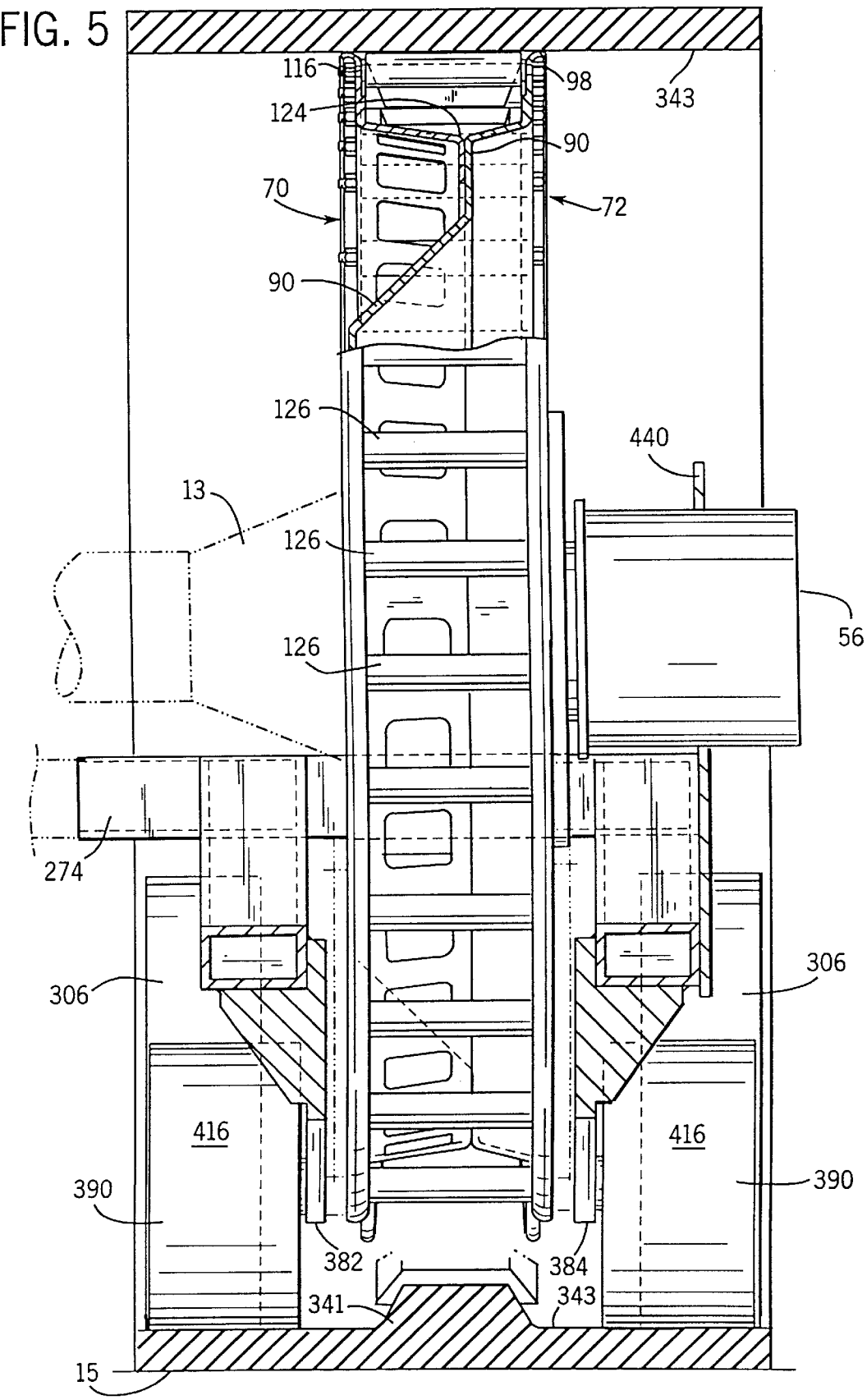
FIG. 5 is a cross-sectional of a track system taken along line 5—5 of FIG. 2.
Figure 6:
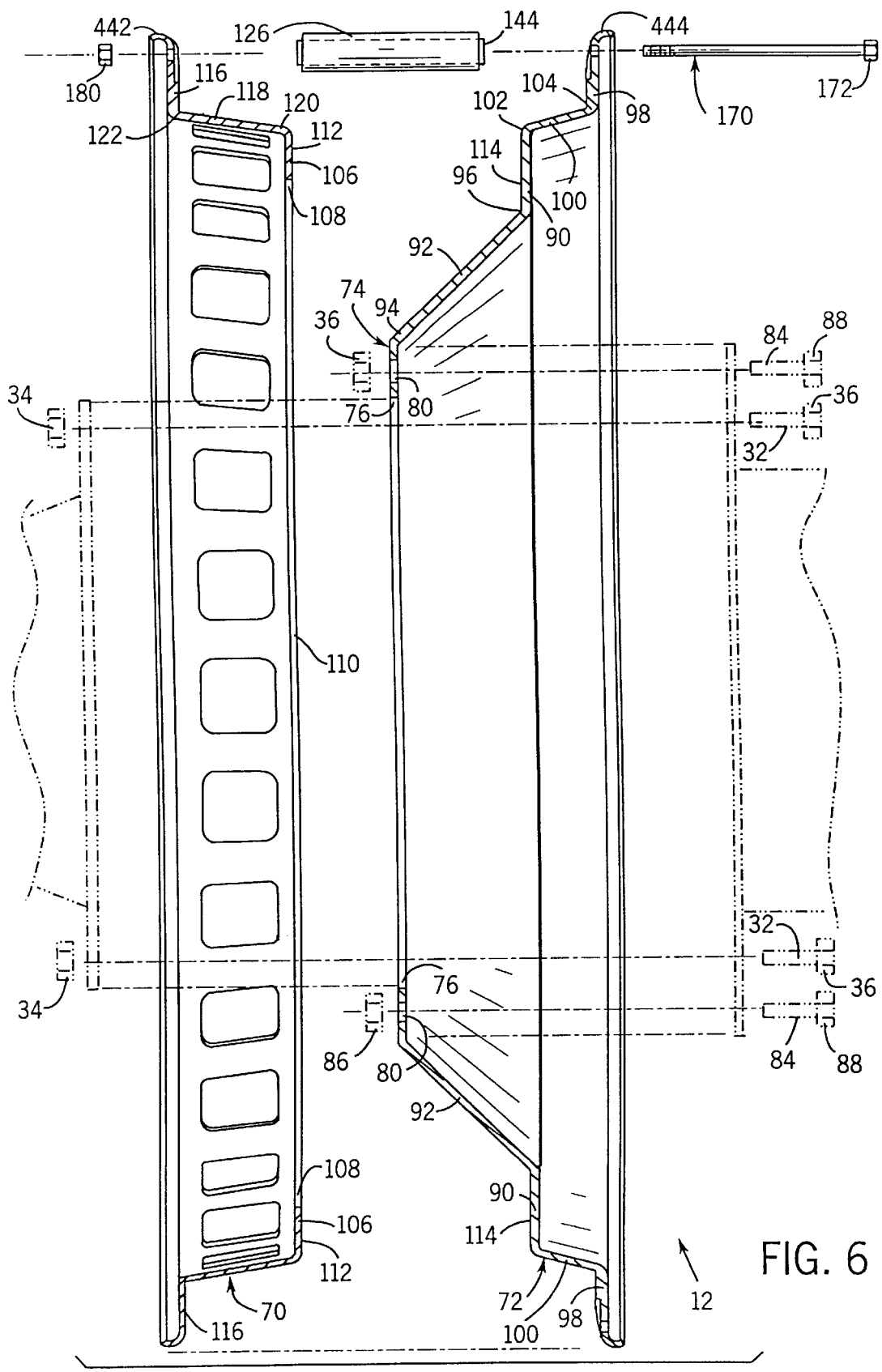
FIG. 6 is a exploded, side-elevational view, partially in section, showing the drive wheel of the present invention.

Drive spindle 16 is also interconnected to drive wheel 12. As best seen in FIGS. 5–6, drive wheel 12 includes an inner rim 70 and an outer rim 72. Outer rim 72 includes a central hub 74 which includes a plurality of spaced attachment apertures 80 therein. Drive wheel 12 is positioned such that the radially inner edge 76 of outer rim 72 is aligned with the radially outer edge 78 of attachment flange 30 of axle 13. Attachment apertures 80 in outer rim 72 are aligned with corresponding attachment apertures 82 which are spaced in attachment flange 24 of drive spindle 16. Bolts 84 extend through attachment apertures 82 in attachment flange 24 of drive spindle 16 and through attachment apertures 80 in outer rim 72 of drive wheel 12. Nuts 86 are threaded on corresponding bolts 84 so as to capture outer rim 72 of drive wheel 12 and attachment flange 24 of drive spindle 16 between nuts 86 and corresponding bolt heads 88 of bolts 84. With drive wheel 12 interconnected to drive spindle 16 as heretofore described, rotation of axle 13 will, in turn, rotate the drive wheel 12 in unison therewith.

Outer rim 72 includes an inner rim mounting portion 90 extending radially from the longitudinal axis of axle 13 and axially spaced from central hub 74. Inner rim mounting portion 90 is interconnected to central hub 74 by a generally conical rim wall 92 which diverges from the radially outer edge 94 of central hub 74 to the radially inner edge 96 of inner rim mounting portion 90.

Outer rim 72 further includes a radially extending outer guide wall 98 which is axially spaced from inner rim mounting portion 90 of outer rim 72. Outer guide wall 98 is interconnected to inner rim mounting portion 90 by a generally conical connection portion 100 of outer rim 72 which diverges from the radially outer edge 102 of inner rim mounting portion 90 to the radially inner edge 104 of outer guide wall 98.

Inner rim 70 includes a radially extending mounting portion 106 having a radially inner edge 108 defining a central hub receiving opening 110. Conical portion 92 of outer rim 72 is positioned with central hub receiving opening 110 in inner rim 70 such that the outer surface 112 of mounting portion 106 of inner rim 70 abuts the inner surface 114 of inner rim mounting portion 90 of outer rim 72. The outer surface 112 of mounting portion 106 of inner rim 70 is interconnected to the inner surface 114 of mounting portion 102 of outer rim 72 in any suitable manner such as welding or the like.

Inner rim 70 further includes a radially extending inner guide wall 116 which is radially and axially spaced from mounting portion 106 of inner rim 70. Inner guide wall 116 is interconnected to mounting portion 106 of inner rim 70 by a generally conical connection wall 118 which diverges from the radially outer edge 120 of mounting portion 106 of inner rim 70 to the radially inner edge 122 of inner guide wall 116. Outer guide wall 98 of outer rim 72 and inner guide wall 116 of inner rim 70 are generally parallel to each other and are axially spaced so as to define a circumferentially extending channel 124 in the radially outer edge of drive wheel 12.

Figure 8:
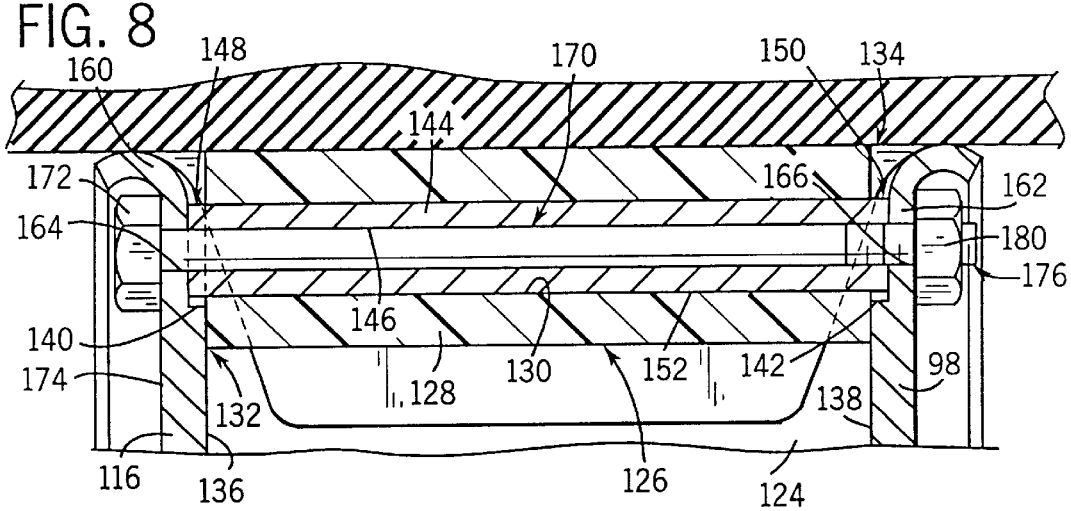
FIG. 8 is a cross-sectional view taken along line 8—8 of FIG. 3 showing a first embodiment of a roller for the drive wheel in accordance with the present invention.

A plurality of circumferentially spaced rollers are mounted within channel 124 of drive wheel 12. Referring to FIG. 8, a first embodiment of a roller for mounting in circumferentially extending channel 124 in drive wheel 12 is generally designated by the reference numeral 126. Each roller 126 includes a tubular, generally cylindrical outer sleeve 128. Outer sleeve 128 extends along a longitudinal axis and includes an inner surface 130 which defines a passageway between first and second ends 132 and 134, respectively, thereof. The first end 132 of outer sleeve 128 abuts the inner surface 136 of inner guide wall 116. Similarly, second end 134 of outer sleeve 128 abuts the inner surface 138 of outer guide wall 98.

Bearing sleeve receipt pockets 140 and 142 are formed in the inner surfaces 136 and 138 of corresponding guide walls 116 and 98, respectively. Each roller 126 further includes a bearing sleeve 144 which extends through the passageway in outer sleeve 128. Bearing sleeve 144 includes a generally cylindrical inner surface 146 which defines a bolt receiving passageway between the first end 148 and the second end 150 of bearing sleeve 144. Bearing sleeve 144 further includes a generally cylindrical outer surface 152. The outer surface 152 of bearing sleeve 144 forms a rotational interface with the inner surface 130 of outer sleeve 128 such that outer sleeve 128 is rotatable on bearing sleeve 144.

Upper portions 160 and 162 of inner and outer guide walls 116 and 98, respectively, include a plurality of circumferentially spaced pairs of apertures 164 and 166 therethrough. Each of the pairs of apertures 164 and 166 are aligned within corresponding pockets 140 and 142 in inner and outer guide walls 116 and 98, respectively.

In order to interconnect rollers 126 to drive wheel 12, each roller 126 is positioned within circumferentially extending channel 124 in drive wheel 12 such that a first end 148 of bearing sleeve 144 is seated within a corresponding pocket 140 in the inner surface 136 of inner guide wall 116. A second end 150 of bearing sleeve 144 is seated within corresponding pocket 142 in the inner surface 138 of outer guide wall 98.

Bolts 170 are inserted through corresponding apertures 164 and 166 in inner and outer guide walls 116 and 98, respectively and through bolt receiving passageway in bearing sleeve 144. Each bolt 170 includes an enlarged head 172 on a first end thereof which abuts the outer surface 174 of inner guide wall 116. A second, opposite, threaded end 176 extends through corresponding aperture 166 in outer guide wall 98. Nuts 180 are threaded onto the threaded ends 176 of bolts 170 so as to capture bearing sleeves 144 within corresponding pockets 140 and 142 in corresponding inner and outer guide walls 116 and 98, respectively, and to prevent rotational movement of bearing sleeves 144 therebetween.

Figure 9:
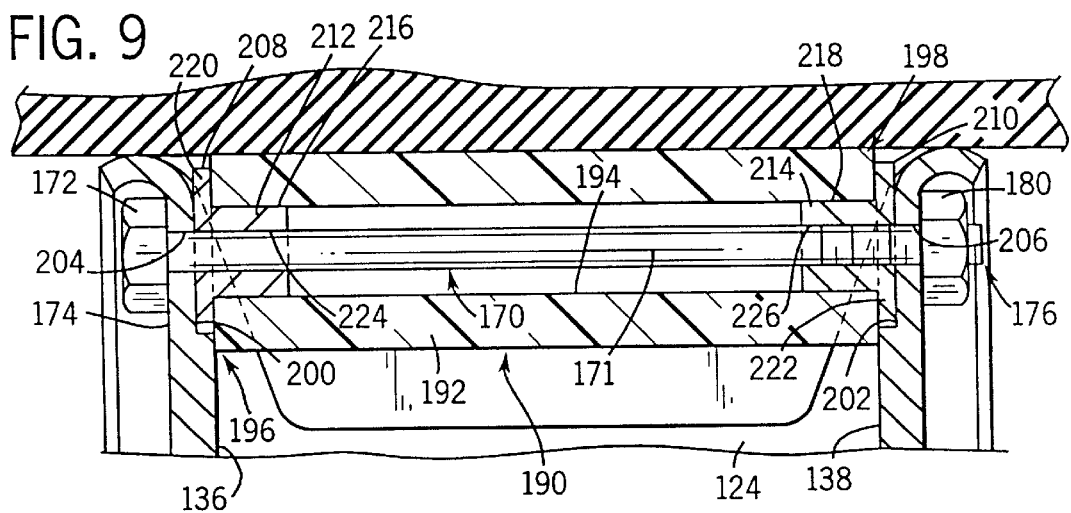
FIG. 9 is a cross-sectional view, similar to FIG. 8, showing a second embodiment of a roller for the drive wheel of the present invention.

Referring to FIG. 9, a second embodiment of a roller for mounting in the circumferentially extending channel 124 in drive wheel 12 is generally designated by the reference numeral 190. Each roller 190 includes a tubular, generally cylindrical outer sleeve 192. Outer sleeve 192 extends along a longitudinal axis and includes an inner surface 194 which defines a passageway between first and second ends 196 and 198, respectively, thereof. The first end 196 of outer sleeve 192 abuts the inner surface 136 of inner guide wall 116. Similarly, second end 198 of outer sleeve 192 abuts the inner surface 138 of outer guide wall 98.

Bushing pockets 200 and 202 are formed in inner surfaces 136 and 138 of corresponding guide walls 116 and 98, respectively. Upper portions 160 and 162 of inner and outer guide walls 116 and 98, respectively, include a plurality of circumferentially spaced pairs of apertures 204 and 206 therethrough. Each of the pairs of apertures 204 and 206 are aligned within corresponding pockets 200 and 202 in inner and outer guide walls 116 and 98, respectively.

Each roller 190 further includes first and second bushings 208 and 210, respectively, which are received in corresponding ends 196 and 198 of outer sleeve 192. Bushings 208 and 210 include corresponding bearing portions 212 and 214. Bearing portions 212 and 214 of bushings 208 and 210, respectively, include a generally outer surface 216 and 218, respectively. Enlarged heads 220 and 222 extend radially from one end of bearing portions 212 and 214 of bushings 208 and 210, respectively. Bushings 208 and 210 further include corresponding bolt passageways 224 and 226, respectively, therethrough.

In order to assemble each roller 190, bearing portion 212 of bushing 208 is inserted into passageway 194 in outer sleeve 192 through end 196 such that enlarged head 220 of bushing 208 abuts end 196 of outer sleeve 192. Similarly, bearing portion 214 of bushing 210 is inserted into passageway 194 through end 198 of outer sleeve 192 such that enlarged head 222 of bushing 210 abuts end 198 of outer sleeve 192. The inner surface 194 of outer sleeve 192 forms a rotational interface with the outer surfaces 216 and 218 of bearing portions 212 and 214 of bushings 208 and 210, respectively. Each roller 190 is positioned within circumferentially channel 124 in drive wheel 12 such that enlarged head 220 of bushing 208 is seated within a corresponding pocket 200 in the inner surface 136 of inner guide wall 116 and such that enlarged head 222 of each bushing 210 is seated within a corresponding pocket 202 in the inner surface 138 of outer guide wall 98.

Bolts 170 are inserted through corresponding pairs of apertures 204 and 206 in inner and outer guide walls 116 and 98, respectively. The shaft 171 of each bolt extends through passageways 224 and 226 in bushings 208 and 210, respectively, and through passageway 194 in outer sleeve 192. Nuts 180 are threaded onto the threaded ends 176 of bolts 170 so as to support rollers 190 between guide walls 116 and 98.

Figure 10:
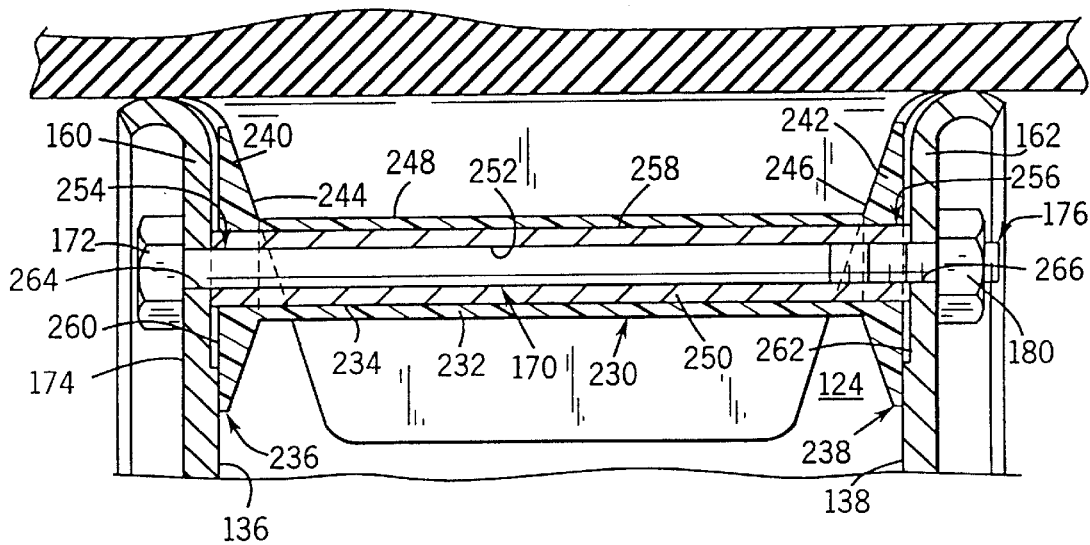
FIG. 10 is a cross-sectional view, similar to FIG. 8, showing a third embodiment of a roller for the drive wheel of the present invention.

Referring to FIG. 10, a third embodiment of a roller for mounting in circumferentially extending channel 124 in drive wheel 12 is generally designated by the reference numeral 230. Each roller 230 includes a tubular, generally cylindrical outer sleeve 232. Outer sleeve 232 extends along a longitudinal axis and includes an inner surface 234 which defines a passageway between first and second ends 236 and 238, respectively, thereof. Outer sleeve 232 further includes first and second enlarged heads 240 and 242, respectively. Enlarged heads 240 and 242 are generally conical in shape and include guide surfaces 244 and 246, respectively, which diverge from each other and from the outer surface 248 of outer sleeve 232.

Each roller 230 further includes a bearing sleeve 250 which extends through passageway in outer sleeve 232. Bearing sleeve 250 includes a generally cylindrical inner surface 252 which defines a bolt receiving passageway between the first and second ends 254 and 256, respectively, thereof. Each bearing sleeve 250 further includes a generally cylindrical outer surface 258 which forms a rotational interface with the inner surface 234 of a corresponding outer sleeve 232 such that outer sleeve 232 is rotatable on bearing sleeve 250.

Bearing sleeve receipt pockets 260 and 262 are formed in the inner surfaces 136 and 138 of corresponding guide walls 116 and 98, respectively. Upper portions 160 and 162 of inner and outer guide walls 116 and 98, respectively, include a plurality of circumferentially spaced pairs of holes 264 and 266 therethrough. Each of the pair of holes 264 and 266 are aligned with corresponding pockets 260 and 262 in inner and outer guide walls 116 and 98, respectively.

In order to assemble rollers 230, each roller 230 is positioned within circumferentially extending channel 124 in drive wheel 12 such that a first end 254 of bearing sleeve 250 is seated within corresponding pocket 260 in the inner surface 136 of inner guide wall 116. Second end 256 of each bearing sleeve 250 is seated within corresponding pocket 262 in inner surface 138 of outer guide wall 98. Bolts 170 are inserted through corresponding holes 264 and 266 in inner and outer guide walls 116 and 98, respectively and through bolt receipt passageways in bearing sleeves 250. The enlarged head 172 of each bolt 170 abuts the outer surface 174 of inner guide wall 116. Nuts 180 are threaded onto a threaded end 176 of each bolt 170 so as to capture each bearing sleeve 250 between corresponding pockets 260 and 262 in corresponding inner and outer guide walls 116 and 98, respectively, and to prevent rotational movement of each bearing sleeve 250 therebetween.

Figure 2:
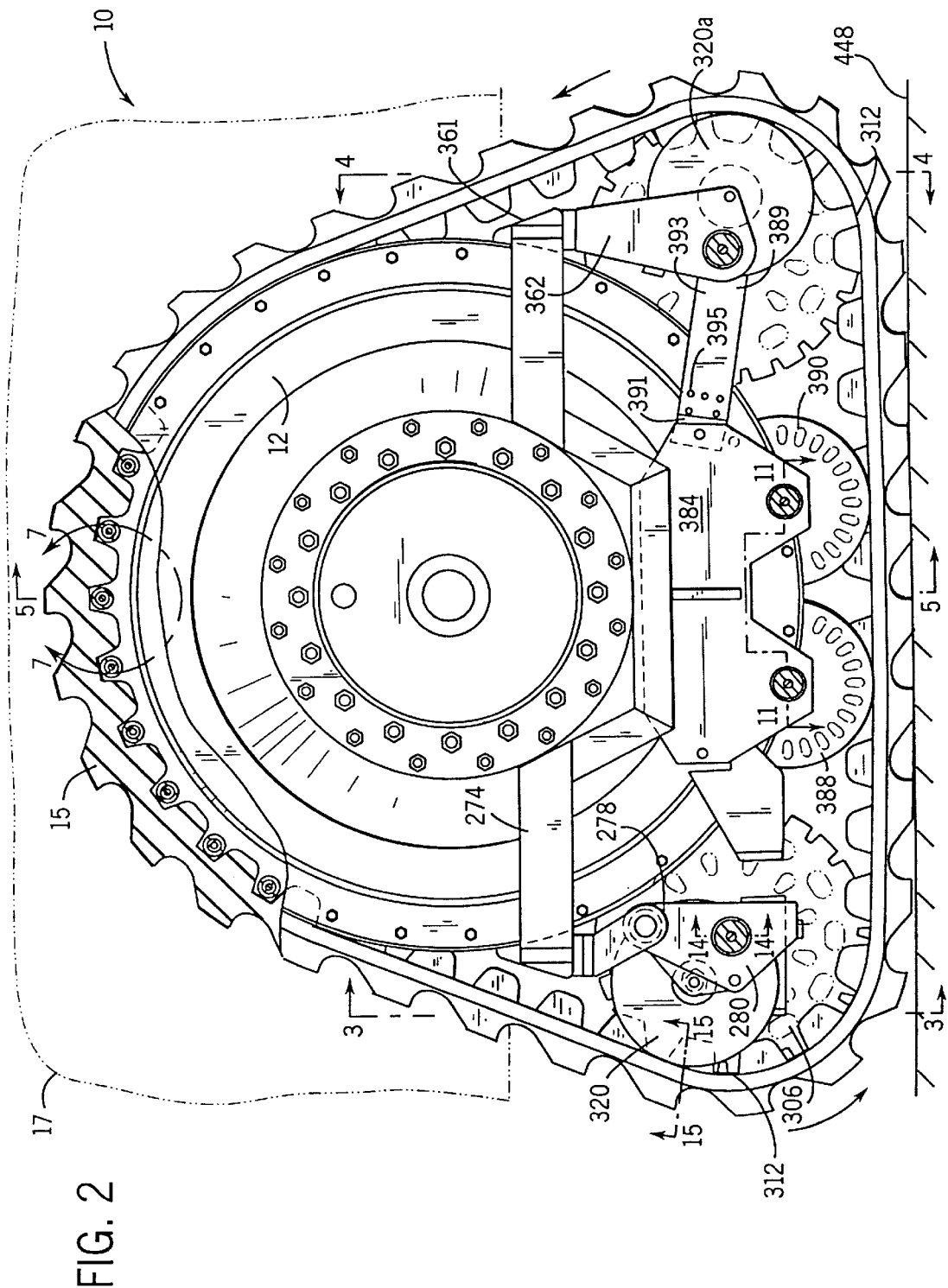
FIG. 2 is a side elevational view, partially in section, showing the track system of FIG. 1.
Figure 3:
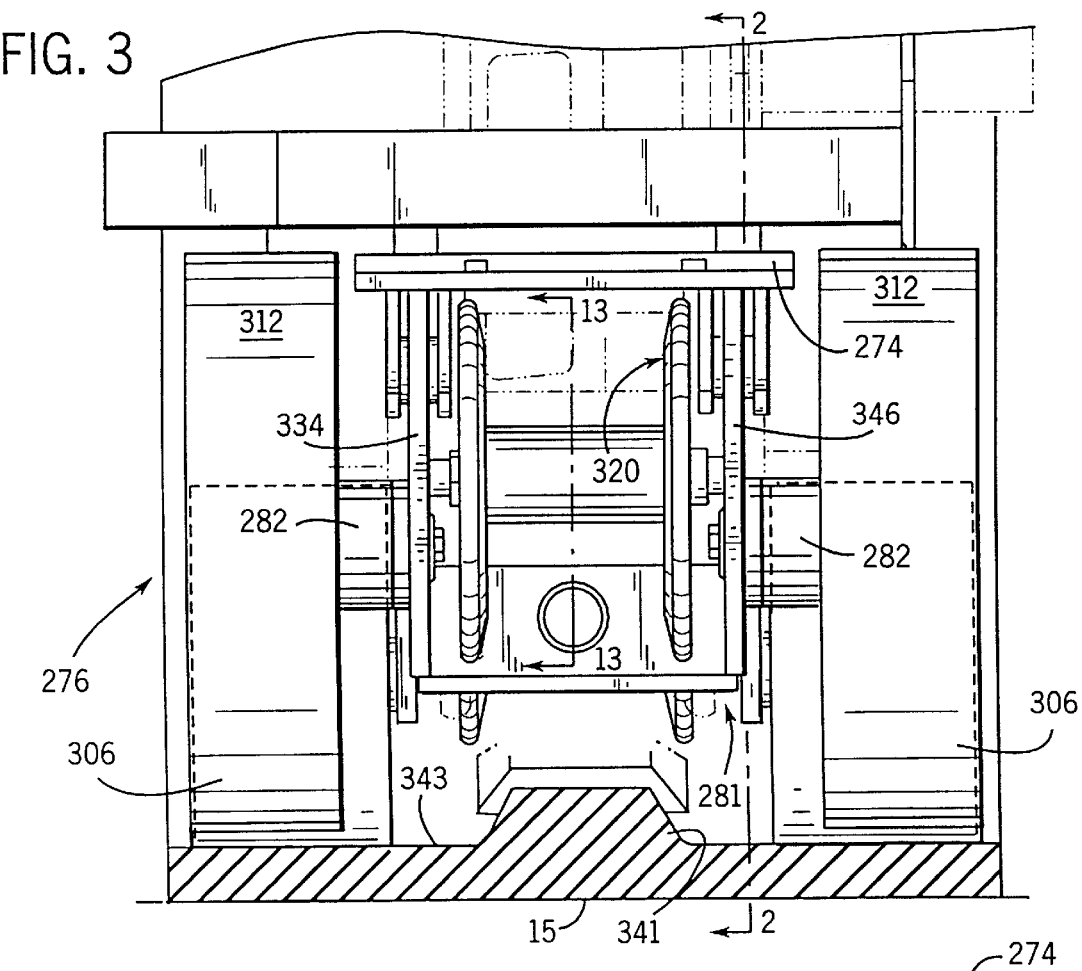
FIG. 3 is a cross-sectional view of the track system taken along line 3—3 of FIG. 2.

As best seen in FIG. 5, a frame 274 is positioned about drive wheel 12 and rigidly connected to the vehicle. Referring to FIGS. 2–3, a leading idler assembly 276 is pivotably mounted to frame 274 at the proximal ends 278 of leading idler arms 280. Idler arms 280 extend downwardly from frame 274 and define a drive wheel passageway 281 therebetween. Leading idler arms 280 rotatably support corresponding idler axles 282.

Referring to FIG. 14, idler axles 282 extend laterally from outer surfaces 283 of corresponding leading idler arms 280. Each idler axle 282 includes a mounting cap 284 having a generally cylindrical mounting portion 286 of a diameter generally equal to the diameter of axle mounting opening 288 in each leading idler arm 280. Mounting portions 286 of mounting caps 284 are secured within axle mounting openings 288 in corresponding leading idler arms 280 by any suitable means such as welding or the like. Each mounting cap 284 further includes an enlarged head 290 which extends radially from the outer surface 292 of mounting portion 286 and which abuts the outer surface 283 of a corresponding leading idler arm 280.

Each mounting cap 284 defines an shaft receiving cavity 296 which receives a first end 298 of a corresponding shaft 300. Each shaft 300 is rigidly connected to corresponding mounting cap 284 by a bolt 302 which extends through mounting portion 286 of each mounting cap 284 and into first end 298 of corresponding shaft 300. In addition, an anti-rotation pin 301 is inserted through mounting portion 286 of each mounting cap 284 into a corresponding shaft 300 so as to prevent rotation of shaft 300.

Each idler axle 282 further includes a rotatable sleeve 304 mounted over corresponding shaft 300. Each rotatable sleeve includes a first end which abuts enlarged head 290 of a corresponding mounting cap 284 and a second, opposite end. Bearings, bushings or the like may be positioned between the inner surface 303 of rotatable sleeve 304 and the outer surface 305 of corresponding shaft 300 in order to facilitate rotation of rotatable sleeve 304 on corresponding shaft 300.

Idler wheels 306 are mounted on rims 307, FIG. 1, in a conventional manner which, in turn, are mounted on corresponding rotatable sleeves 304 of idler axles 282 in a conventional manner for rotational movement therewith.

Figure 21:
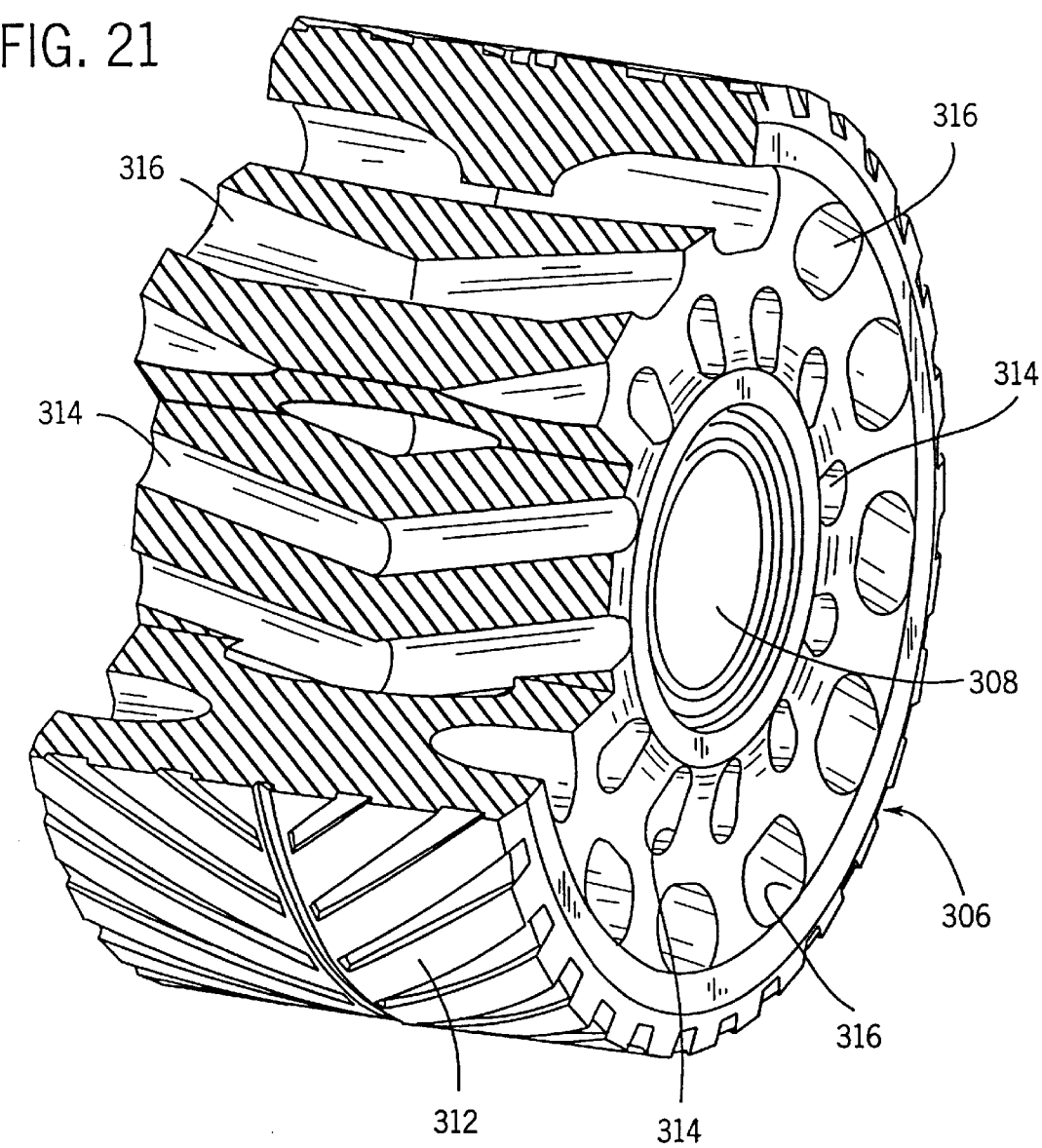
FIG. 21 is an isometric view, partially in section, showing an idler wheel for use in the track system in FIG. 1.
Figure 22:
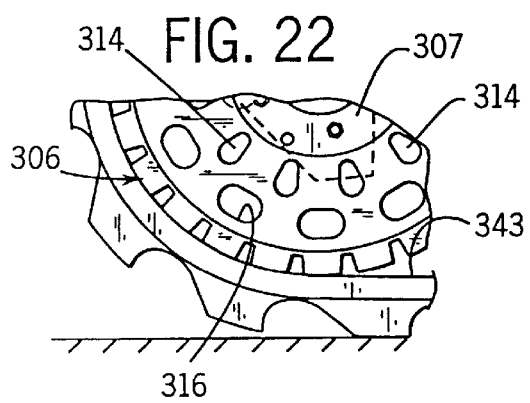
FIG. 22 is an enlarged view taken along line 22—22 of FIG. 1.
Figure 23:
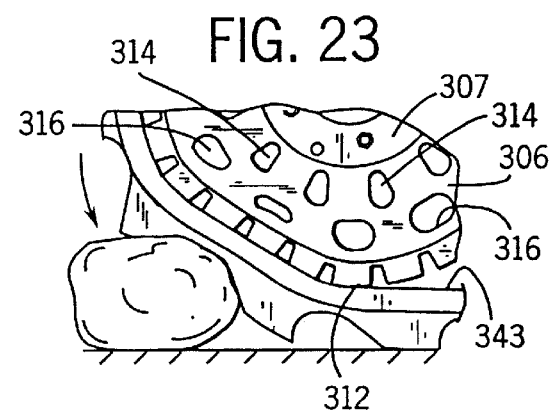
FIG. 23 is an enlarged view, similar to FIG. 22, showing the track system engaging a rock in an agricultural field.

Referring to FIGS. 21–23, each idler wheel 306 is non-pneumatic and is constructed from a rubber or rubber-like material. Each idler wheel 306 includes a generally cylindrical inner surface 308 which is dimensioned for receipt on a conventional rim 307, and a radially outer surface 312 having a plurality of treads thereon for engaging the inner surface 343 of flexible track 15.

Each idler wheel 306 further includes a first set of air cavities 314 therein. The first set of air cavities 314 are spaced from each other at a predetermined radial distance from the axial center of idler wheel 306. In addition, each idler wheel 306 includes a second set of air cavities 316 which are spaced about each idler wheel 306 at a predetermined distance from the axial center of idler wheels 306. The second set of air cavities 316 are spaced at a greater predetermined radial distance from the axial center of idler wheels 306 than the first set of air cavities 314.

The first and second sets of air cavities 314 and 316, respectively, in idler wheels 306 are arranged to allow for the radially outer surface 312 of idler wheel 306 to deflect a predetermined amount in response to external force on the radially outer surface 312, FIG. 23. It is contemplated that being within the scope of the present invention to arrange the first and second set of air cavities 314 and 316, respectively, in other patterns within idler wheel 306 in order to obtain the proper deflection of the outer surface 312 of idler wheel 306 in response to a predetermined external force thereon.

Referring to FIGS. 13 and 15–17, track system 10 further includes a guide wheel 320 positioned within the drive wheel passageway 281 between leading idler arms 280, FIG. 3. Guide wheel 320 includes a central hub 322 having a generally cylindrical outer surface 324 and a generally cylindrical inner surface 326 which defines a passageway therethrough.

Figure 15:
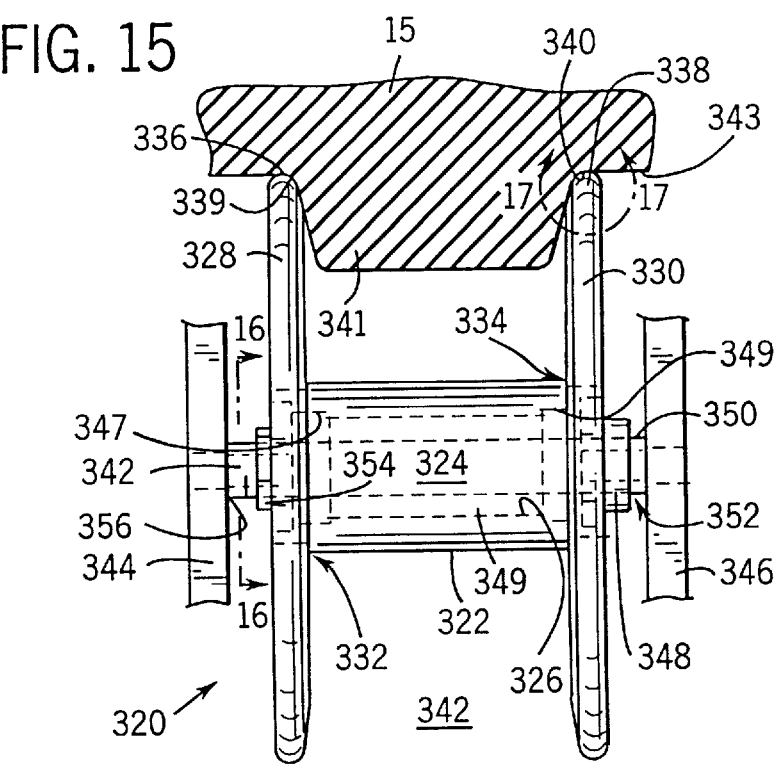
FIG. 15 is a cross-sectional view of the track system taken along line 15—15 of FIG. 2.
Figure 16:
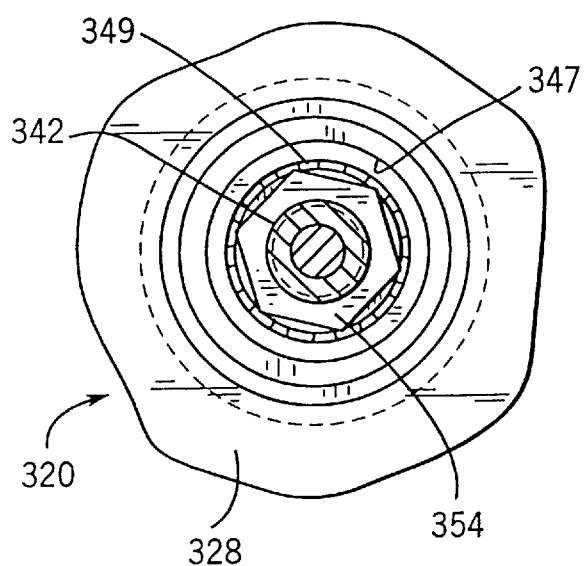
FIG. 16 is a cross-sectional view taken along line 16—16 of FIG. 15.
Figure 17:
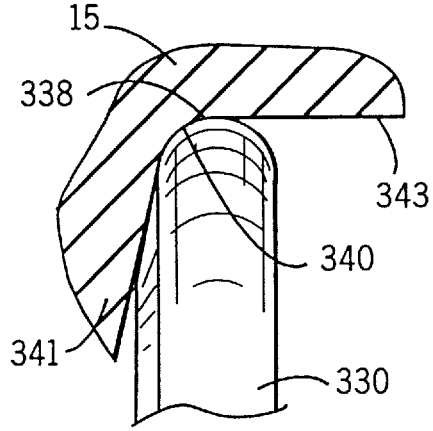
FIG. 17 is an enlarged, cross-sectional view taken along line 17—17 of FIG. 15.

Guide wheel 320 further includes first and second guide walls 328 and 330, respectively, which extend radially from opposite ends 332 and 334 of central hub 322. Each guide wall 328 and 330 terminates at a radially outer edge 336 and 338, respectively. As best in FIG. 17, the outer edges 336 and 338 of corresponding guide walls 328 and 330, respectively, have a predetermined radius such that the outer edges 336 and 338 of guide walls 328 and 330, respectively, form a mating relationship with junctions 339 and 340, respectively, of each lug 341 extending from the inner surface 343 of flexible track 15. As best seen in FIG. 15, guide walls 328 and 330 define a circumferentially extending lug receiving channel 345 therebetween having a predetermined width greater than the width of each lug 341.

Inner surface 326 of central hub 322 defines enlarged bearing receiving bores 347a and 347b at opposite ends 332 and 334, respectively, thereof. A separation tube 349 is received within the passageway defined by the inner surface 326 of central hub 322 and thereafter mounted on a guide wheel shaft 342. Bearings are positioned about the guide wheel shaft 342 within corresponding bearing receiving bores 347 and 349 such that guide wheel 320 is rotatable on separation tube 349 about guide wheel shaft 342.

Guide wheel shaft 342 extends between first and second guide wheel support arms 344 and 346, respectively, which depend from frame 274. As best seen in FIG. 13, guide wheel shaft 342 is parallel to and radially spaced from idler axles 282 of leading idler assembly 276. Guide wheel shaft 342 includes a collar 348 which extends radially from the outer surface 350 thereof at a location adjacent a first end 352 of shaft 342. An adjustable nut 354 is mounted a second end 356 of shaft 342 so as to capture guide wheel 320 on shaft 342 therebetween. Nut 354 may be rotated on a threaded portion of guide wheel shaft 342 so as to vary the axial distance between nut 354 and collar 348 in order to limit lateral movement of guide wheel 320 along guide wheel shaft 342.

Figure 4:
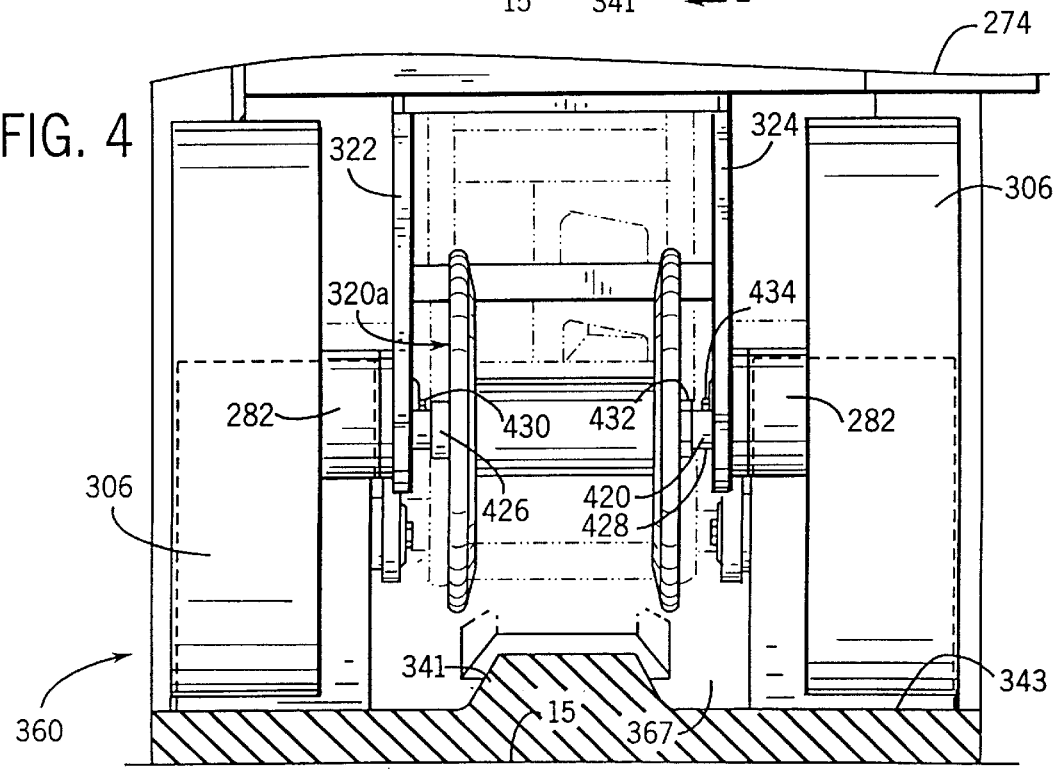
FIG. 4 is a cross-sectional view of the track system taken along line 4—4 of FIG. 2.

Referring to FIG. 4, track system 10 further includes a trailing idler assembly 360 which is rigidly mounted to frame 274 at the proximal ends 361 of trailing idler arms 362. Trailing idler arms 362 define a second drive wheel passageway 367 therebetween such that drive wheel 12 may pass therebetween. Distal ends 366 of trailing idler arms 362 support corresponding idler axles 282. Each idler axle 282 is mounted within the distal end 366 of a corresponding trailing idler arm 362 in the same manner as idler axles 282 are mounted in corresponding leading idler arms 280 and hence, the description heretofore of the mounting of the idler axles 282 in the leading idler arms 280 is understood to describe the mounting of the idler axles 282 in their corresponding trailing idler arms 362 as if described fully herein.

Idler wheels 306 for trailing idler assembly 360 are mounted on corresponding rotatable sleeves 304 of idler axles 282 as heretofore described. The radially outer surface 312 of each idler wheel 306 of trailing idler assembly 360 engages the inner surface 343 of flexible track 15. As previously described, the first and second sets of air cavities 314 and 316, respectively, in idler wheels 306 are arranged to allow for the radially outer surface 312 of each idler wheel 306 of trailing idler assembly 360 to deflect in response to an external force on the radially outer surface 312 thereof.

Track system 10 further includes a mid-roller or bogie assembly 380 positioned between leading idler assembly 276 and the trailing idler assembly 360, FIGS. 1–2. As best seen in FIGS. 11–12, bogie assembly 380 includes first and second bogie wheel support members 382 and 384, respectively, transverse in the longitudinal axis of the axle 13 of the vehicle. Each bogie wheel support member 382 and 384 is interconnected to a corresponding trailing idler arm 362 by a bogie connection arm 389, FIG. 2. Bogie connection arms 389 include inner and outer plates 391 and 393, respectively, interconnected by a plurality of bolts. Each plate 391 and 393 includes a plurality of offset bolt openings 395 which allow a user to adjust the length of bogie connection arm 389 in a conventional matter by lining up different bolt openings 395 in each plate 391 and 393. Outer plates 393 of bogie connection arms 389 have distal ends 392a welded to the outer edge of corresponding trailing idler arms 362. Proximal ends 391a of inner plates 391 of bogie connection arms 389 are interconnected to the trailing ends of corresponding bogie wheel support member 382 and 384.

Each bogie wheel support member 382 and 384 rotatably supports a leading bogie wheel 388 and trailing bogie wheel 390. Each bogie wheel 388 and 390 is rotatably supported on a bogie stub axle 392 which extends laterally from a corresponding bogie wheel support member 382 and 384. Each bogie stub axle 392 includes a mounting cap 394 having a generally cylindrical mounting portion 396 of a diameter generally equal to the diameter of a corresponding bogie axle mounting opening 398 in bogie wheel support members 382 and 384.

Mounting portion 396 of each mounting cap 394 is secured within a corresponding bogie axle mounting opening 398 by any suitable means such as welding or the like. Each mounting cap 394 further includes an enlarged head 400 which extends radially from the outer surface 402 of mounting portion 396 and which abuts the outer surface of a corresponding bogie wheel support members 382 and 384.

Each mounting cap 394 defines a shaft receiving cavity 406 which receives a first end 408 of a corresponding shaft 410. Each shaft 410 is rigidly connected to mounting cap 394 by a bolt 412 which extends through mounting portion 396 of each mounting cap 394 and into the first end 408 of corresponding shaft 410. In addition, an anti-rotation pin 404 is inserted through mounting portion 396 of each mounting cap 394 and into a corresponding shaft 410 so as to prevent rotation of shaft 410 within its corresponding mounting cap 394.

Each bogie wheel 388 and 390 is mounted on a rim 411 which, in turn, is mounted in a conventional matter on shaft 410 of corresponding bogie stub axle 392 for rotational movement thereon, FIG. 1. Each bogie wheel 388 and 390 also includes radially outer surface 416 which engages the inner surface 343 of flexible track 15 along the lower length thereof.

Each bogie wheel 388 and 390 is non-pneumatic and constructed from a rubber or rubber-like material and includes a plurality of spaced air cavities 418 which are spaced from each other at a predetermined radial distance from the axial center of each bogie wheel 388 and 390. Air cavities 418 in bogie wheels 388 and 390 are arranged to allow for the radially outer surface 416 of bogie wheels 388 and 390 to deflect a predetermined amount in response to an external force on the outer surface 416 thereof. It is contemplated that air cavities 418 be arranged in other patterns in corresponding bogie wheels 388 and 390 to insure proper deflection of the radially outer surface 416.

As best seen in FIG. 4, track system 10 also includes a trailing guide wheel 320a positioned with drive wheel passageway 367 between trailing idler arms 362. Trailing guide wheel 320a is identical to leading guide wheel 320 and as such, the previous description of leading guide wheels 320 is understood to describe trailing guide wheel 320a. Trailing guide wheel 320a is rotatably supported by trailing guide wheel shaft 420 which extends between first and second trailing guide wheel support arms 322 and 324, respectively, that depend from frame 274. As best seen in FIG. 2, trailing guide wheel shaft 420 is parallel to and radially spaced from idler axles 282 of trailing idler assembly 360. Trailing guide wheel shaft 420 includes a collar 426 which extends radially from the outer surface 428 thereof at a location adjacent a first end 430 of shaft 420. An adjustable nut 432 is mounted on a second end 434 of trailing guide shaft 420 so as to capture trailing guide wheel 320a on trailing guide wheel shaft 342 therebetween. Nut 432 may be rotated on a threaded portion of trailing guide wheel shaft 420 so as to vary the axial distance between nut 432 and collar 426 in order to limit the lateral movement of guide wheel 320a along trailing guide wheel shaft 420.

As best seen in FIG. 1, track system 10 may also include a cover plate 440 mounted to the exterior portion of frame 274. Cover plate 440 discourages the accumulation of soil and debris within track system 10, and in addition, discourages the accidental access to the interior of track system 10 during operation of vehicle 17.

In operation, track system 10 is mounted to axle 13 through drive wheel 12 as heretofore described. Axle 13 of vehicle 17 is rotated in a conventional manner through the vehicle 17 by its engine and through a transmission which can vary the speeds and allow forward and reverse rotation.

Flexible track 15 of track apparatus 10 is positioned over drive wheel 12 such that the radially outer edges 442 and 444 of inner and outer guide walls 116 and 98, respectively, engage the inner surface 343 of flexible track 15. As drive wheel 12 rotates, radially outer edges 442 and 444 of inner and outer guide walls 116 and 98, respectively, of drive wheel 12 form a mating relationship with junctions 339 and 340, respectively, of lug 341 so as to guide lugs 341 into the area between rollers mounted within the circumferentially extending channel 124 in drive wheel 12, FIG. 8. As drive wheel 12 continues to rotate, rollers mounted within the circumferentially extending channel 124 in drive wheel 12 engage lug 341 and drives flexible track 15 about drive wheel 12. Thereafter, each successive roller engages a subsequent lug 341 extending from the inner surface 343 of flexible track 15 so as to drive flexible track 15 about drive wheel 12 in the manner heretofore described. As heretofore described, each roller is rotatable within circumferentially extending channel 124 in drive wheel 12 so as to minimize damage to lugs 341 of flexible track 15 during engagement therewith.

As flexible track 15 approaches guide wheels 320 of leading idler assembly 274, lugs 341 pass between guide walls 328 and 330 of leading guide wheel 320. The radially outer edges 336 and 338 of guide walls 328 and 330, respectively, of leading guide wheel 320 form a mating relationship with junctions 339 and 340, respectively, of each lug 341 so as to prevent lateral movement of flexible track 15. In addition, the radially outer surfaces 312 of idler wheels 306 of leading idler assembly 276 engage the inner surface 343 of flexible track 15 and direct the lower length of flexible track 15 into contact with a supporting surface 448 such as a farmer's field.

As flexible track 15 is driven about drive wheel 12, the lugs 341 pass between leading and trailing bogie wheels 388 and 390, respectively, of bogie wheel support member 382 and leading and trailing bogie wheels 388 and 390, respectively, of bogie wheel support member 384. As previously described, the radially outer surface 416 of each bogie wheel 388 and 390 engages the inner surface 343 of flexible track 15 along its lower length and insures contact of flexible track 15 with supporting surface 448 along the lower length of flexible track 15.

As flexible track 15 approaches trailing idler assembly 360, lugs 341 on the inner surface 343 of flexible track 15 are captured between first and second guide walls 328 and 330, respectively, of trailing guide wheel 320a. The outer edges 336 and 338 of guide walls 328 and 330, respectively, of trailing guide wheel 320a form a mating relationship with junctions 338 and 340, respectively, of each lug 341 extending from the inner surface 343 of flexible track 15 so as to prevent lateral movement of flexible track 15. In addition, the radially outer surfaces 312 of idler wheels 306 of trailing idler assembly 360 engage the inner surface 343 of flexible track 15 and guide flexible track 15 onto drive wheel 12 to form a continuous loop.

It is contemplated as being the scope of the present invention to rotate drive wheel 12 in a second, opposite direction such that trailing idler assembly 360 may function as a leading idler assembly, and such that leading idler assembly 276 may function as a trailing idler assembly as heretofore described.

Various modes of carrying out the invention are contemplated as being within the scope of the following claims particularly pointing out and distinctly claiming the subject matter as regarded as the invention.

We claim:

1. A track apparatus having a frame, the track apparatus mountable on a rotatable axle of a vehicle, comprising:
    a continuous flexible track having an upper length and a ground-engaging lower length and including an inner surface;
    a drive wheel mountable to the rotatable axle of the vehicle for rotational movement therewith, the drive wheel engaging the inner surface of the flexible track along the upper length to drive the flexible track in response to rotation of the axle of the vehicle;
    a generally solid, leading idler wheel rotatably mounted on the distal end of the leading idler arm and having a radially outer surface which engages the inner surface of the flexible track, the leading idler wheel including a first set of spaced voids extending therethrough so as to allow the leading idler wheel to be resilient in response to an external force on the radially outer surface thereof.

2. The track apparatus of claim 1 wherein the leading idler wheel includes a second set of spaced voids therein, the second set of spaced voids in the leading idler wheel being radially spaced from the first set of voids in the leading idler wheel.

3. The track apparatus of claim 1 wherein the leading idler wheel has an axial center and a predetermined radius, and wherein each void of the first set of spaced voids is a predetermined radial distance from the axial center of the leading idler wheel.

4. The track apparatus of claim 3 wherein the leading idler wheel includes a second set of spaced voids therein, each void of the second set of voids is a predetermined radial distance from the axial center of the leading idler wheel.

5. The track apparatus of claim 4 wherein the predetermined radial distance each void of the first set of voids from the axial center of the leading idler wheel is greater than the predetermined radial distance each void of the second set of voids from the axial center of the leading idler wheel.

6. The track apparatus of claim 1 further comprising:
    a trailing idler arm having a proximal end mounted to the frame and a distal end; and
    a trailing idler wheel rotatably mounted on the trailing idler arm for rotational movement therewith, the trailing idler wheel including a first set of spaced voids therein.

7. The track apparatus of claim 6 wherein the trailing idler wheel includes a second set of spaced voids therein, the second set of spaced voids in the trailing idler wheel being radially spaced from the first set of voids in the trailing idler wheel.

8. The track apparatus of claim 6 wherein the trailing idler wheel has an axial center and a predetermined radius, and wherein each void of the first set of spaced voids is a predetermined radial distance from the axial center of the trailing idler wheel.

9. The track apparatus of claim 8 wherein the trailing idler wheel includes a second set of spaced voids therein, each void of the second set of voids is a predetermined radial distance from the axial center of the trailing idler wheel.

10. The track apparatus of claim 9 wherein the predetermined radial distance each void of the first set of voids from the axial center of the leading idler wheel is greater than the predetermined radial distance each void of the second set of voids from the axial center of the trailing idler wheel.

11. The track apparatus of claim 6 further comprising:
    a bogie arm having a trailing end mounted to the frame and a leading end; and
    a leading bogie wheel engaging the inner surface of the flexible track along lower length and rotatably mounted adjacent the leading end of the bogie arm, the leading bogie wheel having a first set of spaced voids therein.

12. The track apparatus of claim 11 wherein the leading bogie wheel has an axial center and a predetermined radius, and wherein each void of the first set of spaced voids is a predetermined radial distance from the axial center of the leading bogie wheel.

13. The track apparatus of claim 11 further comprising, a trailing bogie wheel engaging the inner surface of the flexible track along lower length and rotatably mounted adjacent the trailing end of the bogie arm, the trailing bogie wheel having a plurality of spaced voids therein.

14. The track apparatus of claim 13 wherein the trailing bogie wheel has an axial center and a predetermined radius, and wherein each void of the first set of spaced voids is a predetermined radial distance from the axial center of the trailing bogie wheel.

15. A track apparatus having a frame, the track apparatus mountable on a rotatable axle of a vehicle, comprising:
    a continuous flexible track having an upper length and a ground-engaging lower length and including an inner surface;
    a drive wheel mountable to the rotatable axle of the vehicle for rotational movement therewith, the drive wheel engaging the inner surface of the flexible track along the upper length to drive the flexible track in response to rotation of the axle of the vehicle;
    a leading idler assembly attached to the frame and including a generally solid leading wheel engaging the flexible track, the leading idler wheel having a plurality of voids therein so as to allow the leading idler wheel to be resilient in response to an external force thereon.

16. The track apparatus of claim 15 wherein the leading idler wheel includes an axial center, and wherein the plurality of voids in the leading idler wheel includes a first set of voids at a predetermined radial distance from the axial center of the leading idler wheel, and a second set of voids radially spaced from the first set of voids.

17. The track apparatus of claim 15 further comprising a trailing idler assembly attached to the frame and including a trailing idler wheel engaging the flexible track, the trailing idler wheel including a plurality of voids therein.

18. The track apparatus of claim 17 wherein the trailing idler wheel includes an axial center, and wherein the plurality of voids in the trailing idler wheel includes a first set of voids at a predetermined radial distance from the axial center of the trailing idler wheel, and a second set of voids radially spaced from the first set of voids.

19. The track apparatus of claim 17 further comprising a leading bogie assembly supported by the frame and including a leading bogie wheel engaging the inner surface of the flexible track along lower length, the leading bogie wheel having a plurality of spaced voids therein.

20. The track apparatus of claim 19 wherein the leading bogie wheel includes an axial center, and wherein the plurality of voids in the leading bogie wheel are a predetermined radial distance from the axial center of the leading bogie wheel.

21. The track apparatus of claim 19 further comprising a trailing bogie assembly supported by the frame and including a trailing bogie wheel engaging the inner surface of the flexible track along lower length, the trailing bogie wheel having a plurality of spaced voids therein.

22. The track apparatus of claim 21 wherein the trailing bogie wheel includes an axial center, and wherein the plurality of voids in the trailing bogie wheel are a predetermined radial distance from the axial center of the trailing bogie wheel.

23. A track apparatus having a frame, the track apparatus mountable on a rotatable axle of a vehicle, comprising:

a continuous flexible track having an upper length and a ground-engaging lower length and including an inner surface;

a drive wheel mountable to the rotatable axle of the vehicle for rotational movement therewith, the drive wheel engaging the inner surface of the flexible track along the upper length to drive the flexible track in response to rotation of the axle of the vehicle;

a leading bogie assembly supported by the frame and having a generally solid, leading bogie wheel engaging the inner surface of the flexible track along the lower length, each leading bogie wheel having a plurality of voids therein so as to allow the leading idler wheel to be resilient in response to an external force thereon; and a trailing bogie assembly supported by the frame and having a generally solid, trailing bogie wheel engaging the inner surface of the flexible track along the lower length, each trailing bogie wheel having a plurality of voids therein so as to allow the trailing idler wheel to be resilient in response to an external force thereon.

24. The track apparatus of claim 23 wherein the drive wheel includes upper and lower circumferential portions, the upper circumferential portion of the drive wheel engaging the flexible track along the upper length.

25. The track apparatus of claim 23 further comprising a leading idler assembly attached to the frame, the leading idler assembly including a leading idler wheel engaging the flexible track and having a plurality of spaced voids therein.

26. The track apparatus of claim 25 further comprising a trailing idler assembly attached to the frame, the trailing idler assembly including a trailing idler wheel engaging the flexible track and having a plurality of spaced voids therein.

27. The track apparatus of claim 23 wherein the leading bogie wheel includes an axial center, and wherein the plurality of voids in the leading bogie wheel are a predetermined radial distance from the axial center of the leading bogie wheel.

28. The track apparatus of claim 27 wherein the trailing bogie wheel includes an axial center, and wherein the plurality of voids in the trailing bogie wheel are a predetermined radial distance from the axial center of the trailing bogie wheel.

* * * * *

UNITED STATES PATENT AND TRADEMARK OFFICE
CERTIFICATE OF CORRECTION

PATENT NO. : 6,068,353
DATED : May 30, 2000
INVENTOR(S) : Kenneth J. Juncker et al It is certified that error appears in the above-identified patent and that said Letters Patent is hereby corrected as shown below:

In column 11, line 19, cancel "292a" and insert --393a--.

Signed and Sealed this

Twentieth Day of March, 2001

Attest:

NICHOLAS P. GODICI

Attesting Officer    Acting Director of the United States Patent and Trademark Office